Jan. 20, 1959  E. A. STALKER  2,869,611
APPARATUS INCLUDING A FEMALE DIE RECEIVING
A RECIPROCATING ARTICULATED MALE DIE FOR
STRETCH-FORMING HOLLOW BLADES
Filed March 18, 1955

INVENTOR.
Edward A. Stalker

United States Patent Office 2,869,611
Patented Jan. 20, 1959

2,869,611

APPARATUS INCLUDING A FEMALE DIE RECEIVING A RECIPROCATING ARTICULATED MALE DIE FOR STRETCH-FORMING HOLLOW BLADES

Edward A. Stalker, Bay City, Mich., assignor to The Stalker Development Company, Bay City, Mich., a corporation of Michigan Application March 18, 1955, Serial No. 495,202

2 Claims. (Cl. 153—32)

This invention relates to twisted hollow fluid turning blades for compressors, turbines and the like and to methods and apparatus for producing the same.

An object of the invention is to provide a hollow twisted blade for compressors, turbines, and the like which is accurately formed throughout to the desired contours and which upon formation is substantially free of internal stress tending to deform under the conditions to which it is subjected in fabrication and in use.

A further object is to provide a process for producing hollow blades for this purpose by means of which the blade may be formed with the precise contours desired and in a manner which is both rapid and economical.

Other objects will appear from the following description, appended drawings, and claims.

The above objects are accomplished by the means illustrated in the accompanying drawings in which—

Figure 2:
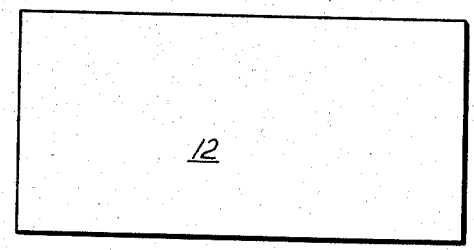
Fig. 2 is a plan view of a blade blank.
Figure 3:
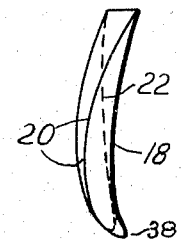
Fig. 3 is an end view of a blade having selected blade contours.
Figure 1:
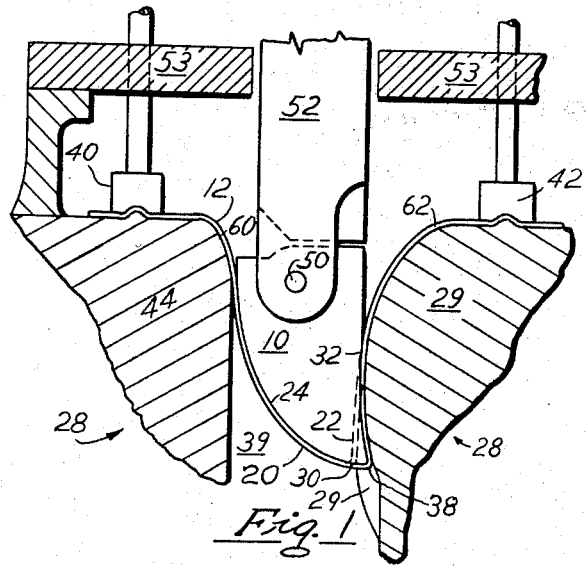
Fig. 1 is a cross section through an apparatus for forming blade envelopes.
Figure 1A:
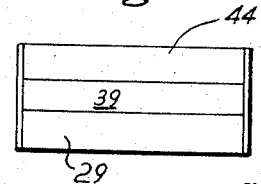
Fig. 1a is a top view of the female dies defining a recess between them.

When a blade envelope is formed by stretching a blank over dies as shown in Fig. 1 it is desirable that the male die 10 does not press the blank 12, Figs. 1, 2 and 3, hard against the female die, so as to avoid introducing internal strains in the blank different from those produced by stretching. Where the blade has substantially different cambers at opposite ends or where one end is angularly displaced relative to the other, it may be said to be twisted, and it is difficult to subject the blank to stretching with a minimum of strains arising from pressures normal to the die surfaces.

In this invention the blade blank 12 of Fig. 2 is stretch-formed to have the section contours of the blade 18 of Fig. 3. It is to be observed that the blade section 20 at one end is differently directed angularly than the blade section 22 at the opposite end.

The blade blank is supported on female die 29 of die means 28 and at another locality spaced from 29, preferably on the die means 44.

The blank 12 is first stretched as shown in Fig. 1. The convex side 24 of the male die 10 gives the blank the precise contours of the portion of the blade back of its nose. The blank however has a larger nose radius than the selected blade section of Fig. 3.

The entire length of the under surface of the blade is formed by the cooperative stretching action between the male die and the female die 29 of die means 28 from point 30 to point 62.

The stroke of the ram carries the male die into a position laterally adjacent to the female die 29 with the male die entering recess 39 freely and with resultant formation of both the upper and lower surfaces of the blade primarily through stretch-forming operations rather than by pressure-forming contact with the female die surface or the bottom of the recess.

The far end of the blank shown by dotted section 22 has the forward portion of its under contour substantially parallel to the direction of movement of the male die 10 so that there is no difficulty with respect to having principally tangential forces acting on the blade blank at this far end.

The near end of the blade blank having blade section 20 (shown by solid lines) is oriented with respect to section 22 so that the leading edge 38 lies below a portion of the female die 29 in the undercut portion thereof. Since the male die should stretch the blank near the nose, the nose of the male die must move downward into recess 39 between the female dies, Fig. 1, and to the right. It will follow such a course since the blank is restrained by the hold-downs 40 and 42 which press the blank against the female dies 44 and 29 respectively. Since the blank is so restrained the male die, because of its sloping convex contour on one side and its substantially different and relatively slight contoured slope on the other side, will slide to the right, stretching the nose portion of the near end of the blank as well as all other portions.

The male die is adapted to move laterally to the right in Fig. 1, that is, transversely to the plane of its downward stroke of movement, by the hinge pin 50 articulating it to the ram 52. This connection also permits the die to be withdrawn when the ram is moved vertically upward.

The bearings 53 guide the ram in its movement.

Figure 6:
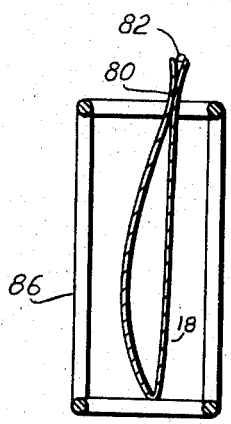
Fig. 6 shows a blade in a brazing rack, before the excess material is cut off at the trailing edge.
Figure 4:
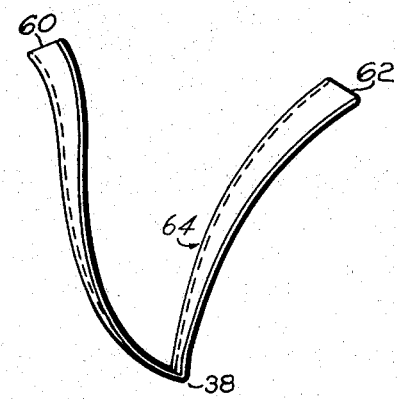
Fig. 4 is an end view of a blade blank after it has been partially formed.
Figure 5:
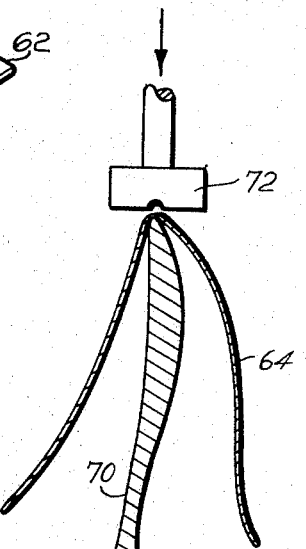
Fig. 5 is a tool for forming the nose of a blade blank, with the mandrel and blank shown in section.

After removing the blank from the dies and cutting it off at 60 and 62 it appears as shown in Fig. 4 as 64. Its contours are precisely those of the blade sections selected for blade 18 except for the magnitudes of the nose radii. These are brought to the selected dimensions by placing the partially formed blank 64 over the mandrel 70 shown in Fig. 5. When pressed by the nose die 72 against the mandrel, the blank 64 takes on the selected nose radii and the rear edge portions are brought into contact and fixed together as shown in Fig. 6, preferably by spot-welds at the locality 80. Outward of 80 the edges of the blank 64 diverge to receive a piece of braze wire 82.

The blade blank 64 is passed through the furnace resting in a rack 86, free of any fixtures which would restrain or determine the dimensions or shape of the blade. The braze wire melts and fixes the rear portions of the blade together. Subsequently the rear portions of the blank 64 are trimmed off just forward of the spot-welds at 80. This brings the blank 64 to the selected shapes of blade 18.

Preferably the hold-downs 40 and 42 restrain the blank only after the male die has pressed the blank into the recess for a major portion of the stroke of the male die.

Because the contours are determined by the stretch of the blade blank over dies, internal strains normal to the blade blank's surface are released, and the blank has set contours corresponding to the shape of the dies. When this blank is heated in a furnace there are no internal strains or stress to cause distortion, warping and twisting. The blank will retain its precise contours with an accuracy of the order of plus or minus 0.002 inch. The production of blades by this method is thus very economical since, among other reasons, no expensive fixtures need be provided to maintain the contours of the blank while it is being heated. These are expensive to make and must be continuously reconditioned to eliminate warpage due to heating and cooling.

While I have illustrated specific forms of the invention, it is to be understood that variations may be made therein and that I intend to claim my invention broadly as indicated by the appended claims.

I claim:

1. Apparatus for stretch-forming a hollow fluid turning blade for compressors, turbines and the like, from a blade blank, comprising a male die supported on a movable ram and having a part thereof articulated for movement transverse to the plane of its stroke, said male die having different slopes on its opposite sides resulting in a lateral force toward the side of lesser slope in working against said blade blank, a die means having a recess for receiving said male die thereinto, said die means having a female die on at least one side of said recess for receiving a blank thereover and of a die surface length corresponding to substantially the entire length of one face of said blade from the nose to the trailing edge thereof for forming said face to the preselected blade contours throughout substantially its chordwise length, said male die being receivable freely in said recess and remaining free of pressure forming contact with the bottom thereof at the end of its stroke, said male die being advanced against said blade blank yieldingly supported across said recess for movement of said blank by said male die into said recess and with articulated movement of said male die laterally of the direction of said ram movement to form said blank against said female die primarily by stretch-forming thereover, means to restrain the movement of said blank into said recess to cause stretch-forming thereof on said male and female dies with resulting production of substantially the final blade contours for the upper and lower blade surfaces of said blade leaving said formed blade substantially free of pressure-induced internal stress.

2. Apparatus for stretch-forming a fluid turning blade for compressors, turbines, and the like, from a blade blank, comprising a male die supported on a movable ram and having a part thereof articulated for movement transverse to the plane of its stroke, said male die having different slopes on its opposite sides resulting in a lateral force toward the side of lesser slope in working against said blade blank, a die means for receiving said blade blank including a female die having an extent and a contour for forming said blank into a major portion of one surface of said blade, said female die having an undercut portion, said male die being advanced past said female die laterally adjacent thereto but free of pressure-forming contact therewith and against said blade blank supported on said die means between said female die and another locality spaced therefrom with articulated movement of said male die laterally toward said female die into said undercut portion thereof to form said blank on said female die primarily by stretch-forming thereover, the forward portion of said male die remaining spaced from said die means and free of pressure forming contact therewith at the end of its stroke, and means to restrain the movement of said blank under the action of said male die to cause stretch-forming of said blank on said male die and on said female die with resulting production of substantially the final blade contours for the upper and lower blade surfaces of said blade leaving said formed blade substantially free of pressure-induced internal stress.

References Cited in the file of this patent

UNITED STATES PATENTS

| | | |
|---|---|---|
| 1,943,978 | Luce | Jan. 16, 1934 |
| 1,962,510 | Kellogg | June 12, 1934 |
| 2,043,591 | Peterson | June 9, 1936 |
| 2,050,142 | White | Aug. 4, 1936 |
| 2,060,690 | Richard | Nov. 10, 1936 |
| 2,202,018 | McCutcheon | May 18, 1940 |
| 2,465,872 | Heath | Mar. 29, 1949 |
| 2,522,683 | Lurcott | Sept. 19, 1950 |
| 2,559,131 | Oestrich | July 3, 1951 |
| 2,577,336 | Lampton | Dec. 4, 1951 |
| 2,613,718 | Vaughn | Oct. 14, 1952 |
| 2,696,241 | Larsen | Dec. 7, 1954 |
| 2,723,445 | Trautvetter | Nov. 15, 1955 |

FOREIGN PATENTS

| | | |
|---|---|---|
| 461,486 | France | Oct. 20, 1923 |